(12) United States Patent
Sato et al.

(10) Patent No.: US 8,532,864 B2
(45) Date of Patent: Sep. 10, 2013

(54) CONTROL APPARATUS FOR AUTONOMOUS OPERATING VEHICLE

(75) Inventors: Kazuhisa Sato, Wako (JP); Makoto Yamamura, Wako (JP); Yoshinori Masubuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 13/241,038

(22) Filed: Sep. 22, 2011

(65) Prior Publication Data

US 2012/0083963 A1    Apr. 5, 2012

(30) Foreign Application Priority Data

Sep. 30, 2010  (JP) ................................ 2010-222642

(51) Int. Cl.
*G05B 19/19*   (2006.01)

(52) U.S. Cl.
USPC ............... 701/26; 700/254; 702/93; 702/151; 73/1.77

(58) Field of Classification Search
USPC ................ 701/23, 25, 26, 41; 700/245, 253, 700/285, 254, 257, 258, 262; 702/85, 92–97, 702/150–151; 73/1.37, 1.38, 1.75, 1.76, 73/1.77, 1.79, 488, 490, 497, 503.3
See application file for complete search history.

(56) References Cited

U.S. PATENT DOCUMENTS

| | | | | |
|---|---|---|---|---|
| 4,890,233 A * | 12/1989 | Ando et al. | ................ | 701/530 |
| 5,115,238 A * | 5/1992 | Shimizu et al. | ................ | 340/988 |
| 5,151,862 A * | 9/1992 | Nakayama et al. | ............ | 701/501 |
| 5,251,139 A * | 10/1993 | Takano et al. | ................ | 701/501 |
| 5,278,424 A * | 1/1994 | Kagawa | ................ | 250/559.37 |
| 5,296,855 A * | 3/1994 | Matsuzaki et al. | ............ | 340/988 |
| 5,337,243 A * | 8/1994 | Shibata et al. | ................ | 701/472 |
| 5,367,463 A * | 11/1994 | Tsuji | ................ | 701/409 |
| 5,938,704 A * | 8/1999 | Torii | ................ | 701/23 |
| 5,947,225 A * | 9/1999 | Kawakami et al. | ............ | 180/271 |
| 6,763,318 B1 * | 7/2004 | Winter et al. | ................ | 702/158 |
| 7,349,759 B2 * | 3/2008 | Peless et al. | ................ | 700/245 |
| 2004/0243293 A1* | 12/2004 | Tominaga et al. | ................ | 701/41 |
| 2005/0172445 A1* | 8/2005 | Diehl et al. | ................ | 15/319 |
| 2005/0234610 A1* | 10/2005 | Shimizu et al. | ................ | 701/23 |
| 2006/0217844 A1* | 9/2006 | Saeki | ................ | 700/258 |
| 2006/0253224 A1* | 11/2006 | Tani et al. | ................ | 700/245 |
| 2007/0150109 A1* | 6/2007 | Peless et al. | ................ | 700/245 |

FOREIGN PATENT DOCUMENTS

| | | |
|---|---|---|
| GB | 2 307 062 A | 5/1997 |
| JP | 60-239812 A | 11/1985 |
| JP | 04359113 A * | 12/1992 |
| JP | 7-047045 * | 2/1995 |
| JP | 8-286738 * | 11/1996 |
| JP | 8-286738 A | 11/1996 |
| JP | 2004113027 A * | 4/2004 |

* cited by examiner

*Primary Examiner* — Thomas Black
*Assistant Examiner* — Ce Li
(74) *Attorney, Agent, or Firm* — Arent Fox LLP

(57) ABSTRACT

In an apparatus for controlling an autonomous operating vehicle, a traveling direction and traveled distance are calculated based on outputs of wheel speed sensor and angular velocity sensor, and the vehicle is controlled to, as traveling straight, perform the operation using an operating machine in accordance with a predetermined travel pattern in a travel-scheduled area based on the calculated traveling direction and traveled distance. It is determined whether a difference between a scheduled-travel distance scheduled in the predetermined travel pattern and an actual traveled distance exceeds a permissible value when the vehicle is traveled straight and a center value of the outputs of the angular velocity sensor is corrected when the difference is determined to exceed the permissible value.

12 Claims, 7 Drawing Sheets

NORMAL TRAVEL ROUTE

FIG.13

CONTROL APPARATUS FOR AUTONOMOUS OPERATING VEHICLE

BACKGROUND

1. Technical Field

The invention relates to a control apparatus for an autonomous operating vehicle, particularly to a control apparatus for a vehicle that autonomously travels to perform work or operation, e.g., mow lawn.

2. Background Art

In an autonomous operating vehicle that autonomously travels to perform work or operation such as mowing lawn in a defined operating (travel-scheduled) area, it is necessary to detect a border of the area. Therefore, magnets are embedded on the border and a sensor sensing the magnets is mounted on the vehicle to detect the border, as taught, for example, by Japanese Laid-Open Patent Application No. Sho 60 (1985)-239812 ('812).

Japanese Laid-Open Patent Application No. Hei 8 (1996)-286738 ('738) discloses a technique to embed an electric wire along the border and detect generated magnetic field by a sensor mounted on an operating vehicle, thereby detecting the border. Since the border of the area can be detected through the techniques of '812 and '738, when a travel pattern is determined in advance for example, it makes possible to control the vehicle to travel based on a traveling direction calculated from an output of a mounted angular velocity sensor.

SUMMARY

However, in the case where the vehicle is traveled in accordance with the predetermined travel pattern in the area as mentioned above, when an error occurs in the traveling direction calculated from the output of the angular velocity sensor, it makes difficult to perform the operation as desired.

An object of the invention is therefore to overcome the foregoing drawback by providing an apparatus for controlling an autonomous operating vehicle that can make the vehicle travel in accordance with a predetermined travel pattern in an operating (travel-scheduled) area and calibrate an output of an angular velocity sensor appropriately.

In order to achieve the object, the invention provides in the first aspect an apparatus for controlling an autonomous operating vehicle having a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while performing operation using the operating machine, comprising: an angular velocity sensor adapted to produce an output indicative of angular velocity generated about a vertical axis in center of gravity of the vehicle; a wheel speed sensor adapted to produce an output indicative of a speed of the driven wheel of the vehicle; a direction and distance calculator adapted to calculate a traveling direction based on the output of the angular velocity sensor and a traveled distance based on the output of the wheel speed sensor; a travel and operation controller adapted to control the vehicle to, as traveling straight, perform the operation using the operating machine in accordance with a predetermined travel pattern in the travel-scheduled area based on the calculated traveling direction and the calculated traveled distance; and a sensor output corrector adapted to determine whether a difference between a scheduled-travel distance scheduled in the predetermined travel pattern and an actual traveled distance exceeds a permissible value when the vehicle is traveled straight and correct a center value of the outputs of the angular velocity sensor when the difference is determined to exceed the permissible value.

In order to achieve the object, the invention provides in the second aspect a method for controlling an autonomous operating vehicle having a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while performing operation using the operating machine, comprising the steps of: obtaining a sensor output indicative of angular velocity generated about a vertical axis in center of gravity of the vehicle; obtaining a sensor output indicative of a speed of the driven wheel of the vehicle; calculating a traveling direction based on the sensor output indicative of the angular velocity and a traveled distance based on the sensor output indicative of the wheel speed; controlling the vehicle to, as traveling straight, perform the operation using the operating machine in accordance with a predetermined travel pattern in the travel-scheduled area based on the calculated traveling direction and the calculated traveled distance; and determining whether a difference between a scheduled-travel distance scheduled in the predetermined travel pattern and an actual traveled distance exceeds a permissible value when the vehicle is traveled straight and correcting a center value of the sensor outputs indicative of the angular velocity when the difference is determined to exceed the permissible value.

BRIEF DESCRIPTION OF DRAWINGS

The above and other objects and advantages will be more apparent from the following description and drawings in which.

DESCRIPTION OF EMBODIMENTS

A control apparatus for an autonomous operating vehicle according to embodiments of the invention will now be explained with reference to the attached drawings.

Figure 1:
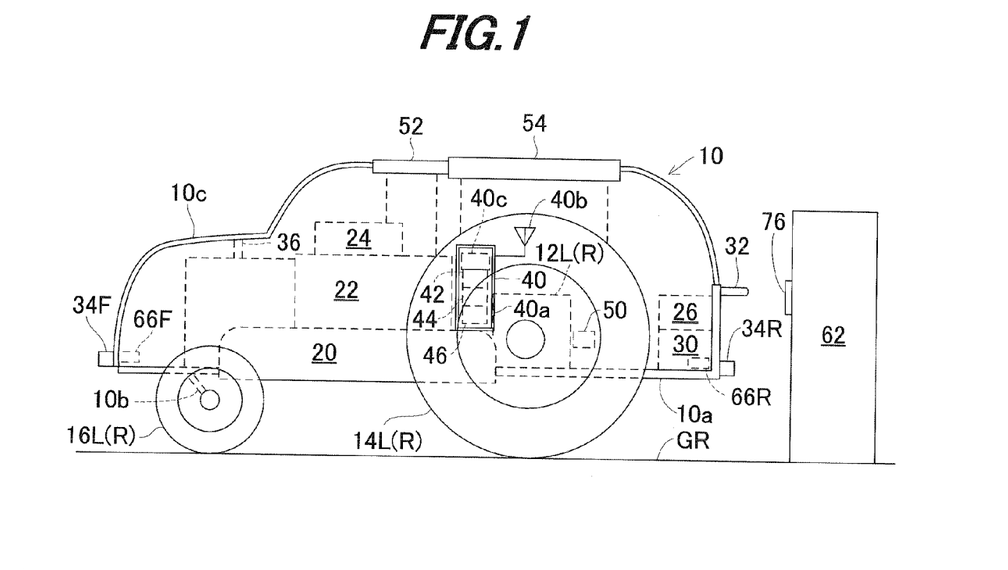
FIG. 1 is an overall schematic view of a control apparatus for an autonomous operating vehicle according to an embodiment of the invention.
Figure 2:
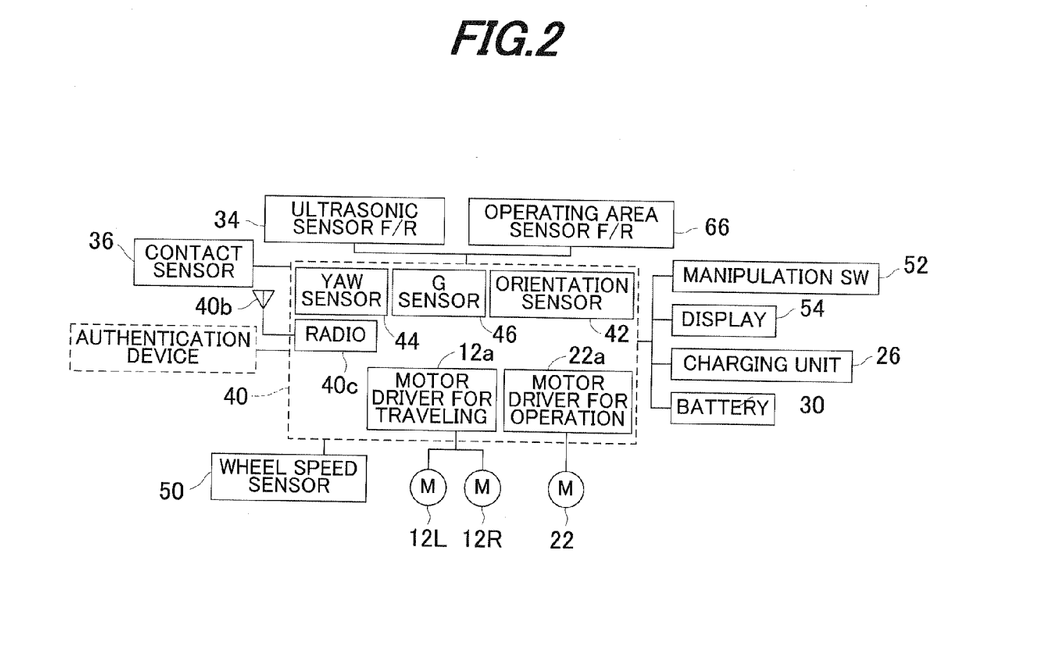
FIG. 2 is a block diagram showing input and output of sensors, an electronic control unit (ECU), electric motors (prime movers), etc., mounted on the vehicle shown in FIG. 1.
Figure 3:
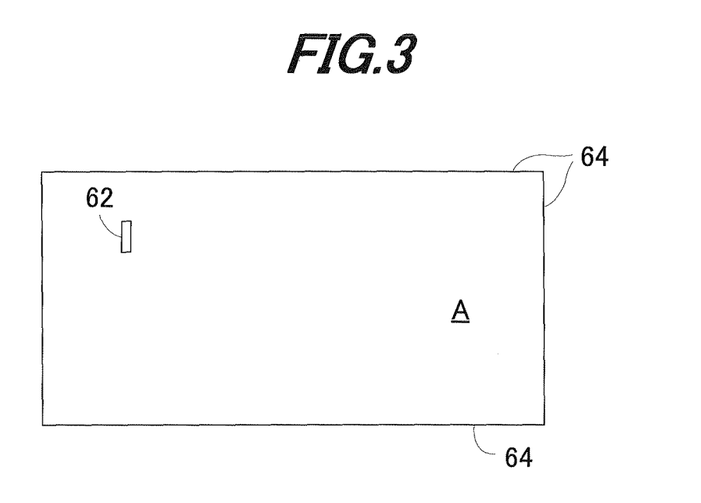
FIG. 3 is a plan view showing a travel-scheduled area where the vehicle of FIG. 1 is to be traveled.
Figure 4:
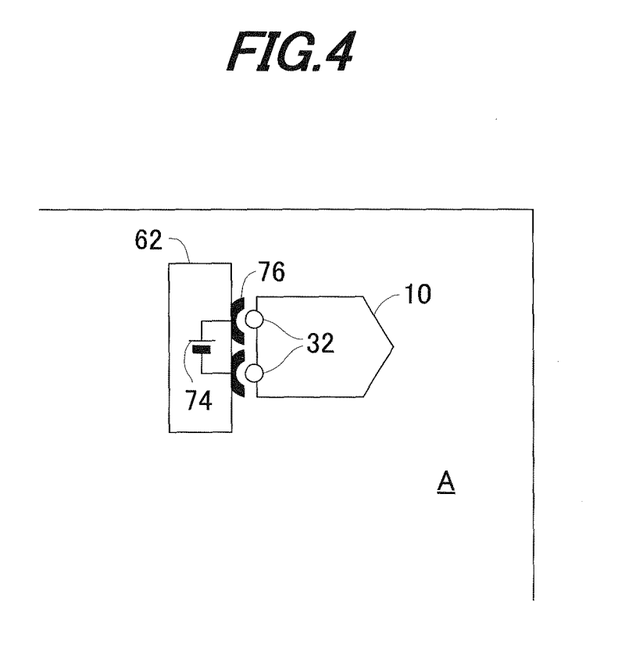
FIG. 4 is an explanatory view showing charging operation at a charge station (ST) shown in FIG. 1.
Figure 5:
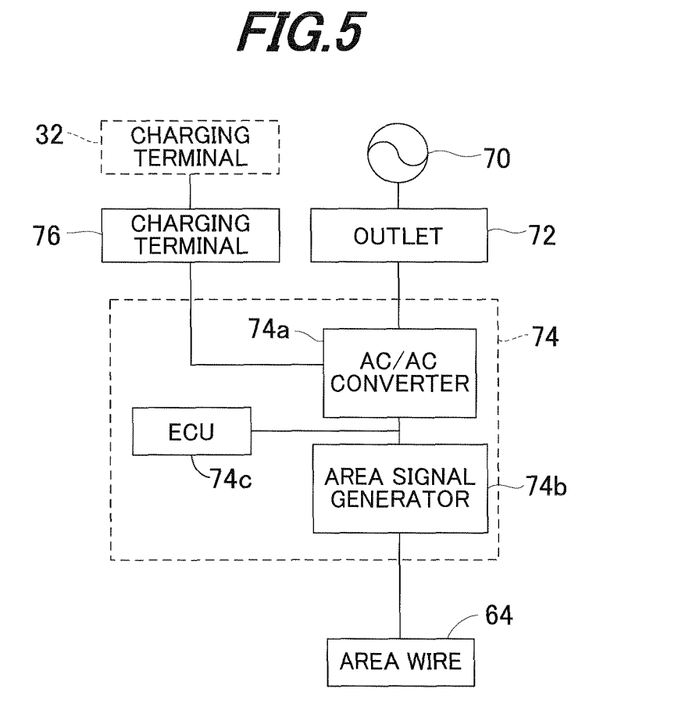
FIG. 5 is a block diagram showing the configuration of the charge ST shown in FIG. 4.
Figure 6:
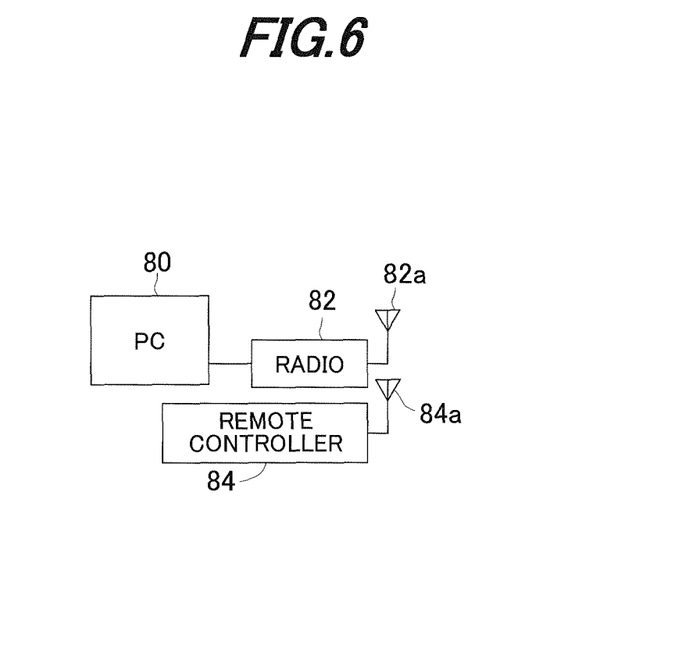
FIG. 6 is a block diagram showing the configuration of manipulation equipment used by an operator for the vehicle shown in FIG. 1.
Figure 7:
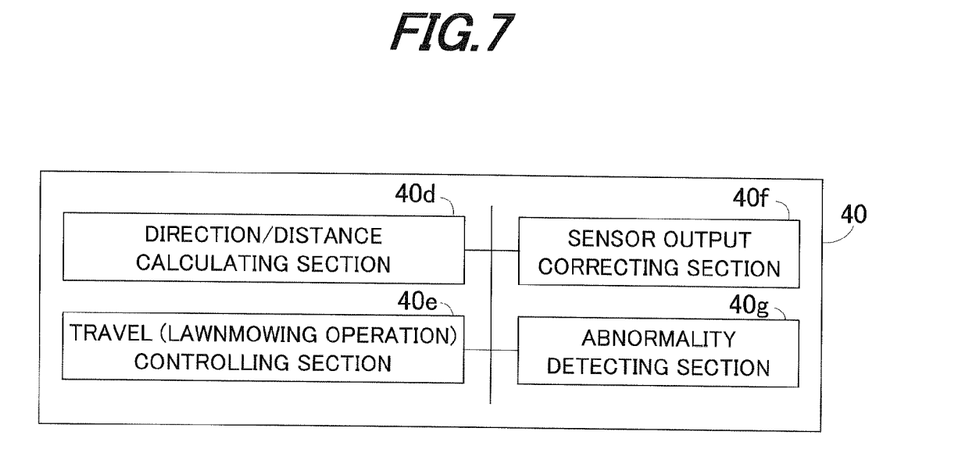
FIG. 7 is a block diagram functionally showing the operation of the apparatus (ECU) shown in FIG. 2.

FIG. 1 is an overall schematic view of a control apparatus for an autonomous operating vehicle according to an embodiment of the invention, FIG. 2 is a block diagram showing input and output of sensors, an electronic control unit (ECU), electric motors (prime movers), etc., mounted on the vehicle, FIG. 3 is a plan view showing a travel-scheduled area where the vehicle of FIG. 1 is to be traveled, FIG. 4 is an explanatory view showing charging operation at a charge station (ST) shown in FIG. 1, FIG. 5 is a block diagram showing the configuration of the charge ST shown in FIG. 4, FIG. 6 is a block diagram showing the configuration of manipulation equipment used by an operator for the vehicle shown in FIG. 1 and FIG. 7 is a block diagram functionally showing the operation of the ECU (apparatus) shown in FIG. 2.

In FIG. 1, symbol 10 indicates an autonomous operating vehicle. As shown in FIGS. 1 and 2, the vehicle 10 is installed with electric motors (prime movers) 12R, 12L for traveling.

The motors 12R, 12L are connected to right and left driven wheels 14R, 14L (only the left side shown) attached on the rear side of a chassis 10a of the vehicle 10 and rotates the driven wheels 14R, 14L in the normal (forward traveling) direction or reverse (backward traveling) direction independently of each other.

Right and left free wheels 16R, 16L (only the left side shown) are attached on the front side of the chassis 10a of the vehicle 10 through a stay 10b. Blades (rotary blades; operating machine) 20 for mowing lawn are attached in the center or thereabout of the chassis 10a.

The blades 20 are connected to an electric motor 22 for operation to be rotated thereby, and also connected to a blade height adjustment mechanism 24 that can be manually operated by an operator (user).

The blade height adjustment mechanism 24 is equipped with screws (not shown) to be manually turned by the operator for adjusting the height of the blades 20 from a contact ground GR. The chassis 10a is attached with a body frame 10c that covers the motors 12, 22, blades 20 and the like.

A charging unit (including an AC/DC converter) 26 and a battery 30 are accommodated at the rear of the vehicle 10 and two charging terminals 32 (later shown in FIG. 4) are attached to the frame 10c to protrude backward.

The terminals 32 are connected to the charging unit 26 and the charging unit 26 is connected to the battery 30 through wiring (not shown). The battery 30 is connected to the motors 12, 22 through wiring (not shown).

Thus the vehicle 10 comprises a four-wheel, unmanned, electric lawn-mower vehicle that is about 500 millimeters long, 300 millimeters wide and 300 millimeters high and configured to travel within an operating (travel-scheduled) area A shown in FIG. 3.

Returning to the explanation on FIG. 1, the front and rear ends of the vehicle 10 are attached with ultrasonic sensors 34F, 34R for detecting an obstacle and the frame 10c is attached with a contact sensor 36. When the frame 10c comes off from the chassis 10a upon having contact with an obstacle and such, the contact sensor 36 outputs an ON signal.

An electronic control unit (ECU) 40 is installed in the center or thereabout of the vehicle 10, more specifically, on a printed-circuit board housed in an ECU housing box 40a. The ECU 40 includes a microcomputer having a CPU, ROM, RAM, I/Os, etc.

An orientation sensor 42 is installed on the board in the ECU housing box 40a in the vicinity of the ECU 40 and generates an output or signal indicative of the primary reference direction on the earth, i.e., the north. The orientation sensor 42 comprises a triaxial geomagnetic sensor having outputs mx, my and mz in directions of three axes x, y and z. In FIG. 4, x indicates a traveling direction of the vehicle 10, y a sideways direction perpendicular to the direction of x, and z a gravitational direction (direction penetrating the plane of paper) perpendicular to the directions of x and y.

The board in the ECU housing box 40a is also installed near the orientation sensor 42 with a Yaw sensor (angular velocity sensor) 44 that (detects and) produces an output or signal indicative of angular velocity (yaw rate) generated about the z-axis in the center of gravity of the vehicle 10 and with a G sensor (acceleration sensor) 46 that (detects and) produces an output or signal indicative of the longitudinal (traveling) direction acceleration G acting on the vehicle 10.

A wheel speed sensor 50 is installed near the driven wheel 14 to (detect and) produce an output or signal representing wheel speed thereof. A manipulation switch (emergency stop switch) 52 is disposed in the vehicle 10 to be manipulatable by the operator, so that the vehicle 10 is stopped traveling when the switch 52 is turned ON by the operator.

The outputs of the foregoing ultrasonic sensors 34, contact sensor 36, orientation sensor 42, Yaw sensor 44, G sensor 46, wheel speed sensor 50 and manipulation switch 52 are sent to the ECU 40.

The upper surface of the frame 10c of the vehicle 10 is widely cut away and a display 54 is installed therein. The display 54 is connected to the ECU 40 to show an operation mode, etc., in response to a command sent from the ECU 40.

A receiving antenna 40b is attached to the ECU housing box 40a and a radio 40c connected to the antenna 40b is installed in the ECU housing box 40a.

The explanation on the travel-scheduled area A shown in FIG. 3 will be made. As shown, the travel-scheduled area A has a shape as illustrated and a charge station (ST) 62 is arranged therein. An area wire (electric wire) 64 is laid and embedded along a border of the travel-scheduled area A and operating area sensors 66F, 66R are installed at the front and rear of the vehicle 10, as shown in FIG. 1.

The operating area sensors 66 comprise magnetic sensors and produce outputs or signals indicative of magnetic field which is to be generated at the area wire 64 upon the supply of alternating current, as explained later. The outputs of the operating area sensors 66 are also sent to the ECU 40.

As mentioned, the charge ST 62 is provided in the travel-scheduled area A so that, as shown in FIG. 4, the vehicle 10 can be stopped and connected to the charge ST 62 through the charging terminals 32 to be charged thereby. As shown in FIG. 5, the charge ST 62 is equipped with a charging device 74 connected to the commercial power source 70 through an electric outlet 72.

The charging device 74 has an AC/AC converter 74a, an area signal generator 74b supplying alternating current to the area wire 64 to generate the magnetic field (area signal), and an electronic control unit (ECU) 74c controlling their operation, and is connectable to the charging terminals 32 of the vehicle 10 through charging terminals 76.

Specifically, the alternating current coming from the commercial power source 70 through the outlet 72 is sent to the charging device 74, the voltage thereof is appropriately stepped down by the AC/AC converter 74a and, when the vehicle 10 is connected to the charge ST 62 through the charging terminals 32 and 76, the alternating current is supplied to the vehicle 10 and stored in the battery 30 through the charging unit 26.

Manipulation equipment to be used by the operator for manipulating the vehicle 10 includes a personal computer 80, a radio 82 connected thereto and a remote controller 84, as shown in FIG. 6. The radio 82 and remote controller 84 have transmitting antennas 82a, 84a, respectively, so that they can send operation commands to the ECU 40 through the receiving antenna 40b and radio 40c in the vehicle 10.

Note that the ECU 40 and charging device 74 are made connectable with an antitheft authentication device or the like.

As shown in FIG. 7, the ECU 40 has a direction and distance calculating section 40d that calculates a traveling direction in which the vehicle 10 travels based on the output of the Yaw sensor 44 and calculates a traveled distance of the vehicle 10 based on the output of the wheel speed sensor 50; a travel and operation (lawnmowing operation) controlling section 40e that controls the vehicle 10 to, as traveling straight through a motor driver 12a, perform the operation using the blades (operating machine) 20 through a motor driver 22a in accordance with a predetermined travel pattern in the travel-scheduled area A based on the calculated traveling direction and traveled distance; and a sensor output correcting section 40f that, when the vehicle 10 is traveled straight, determines whether a difference between a scheduled-travel distance L1 scheduled in the predetermined travel pattern and an actual traveled distance L2 exceeds a permissible value α and when the difference is determined to exceed the permissible value α, corrects the center value of the outputs of the Yaw sensor 44.

The ECU 40 further has an abnormality detecting section 40g that stops the vehicle 10 traveling when it detects an abnormality based on the outputs of the ultrasonic sensors 34 and contact sensor 36 or when the manipulation switch 52 is turned ON.

Figure 8:
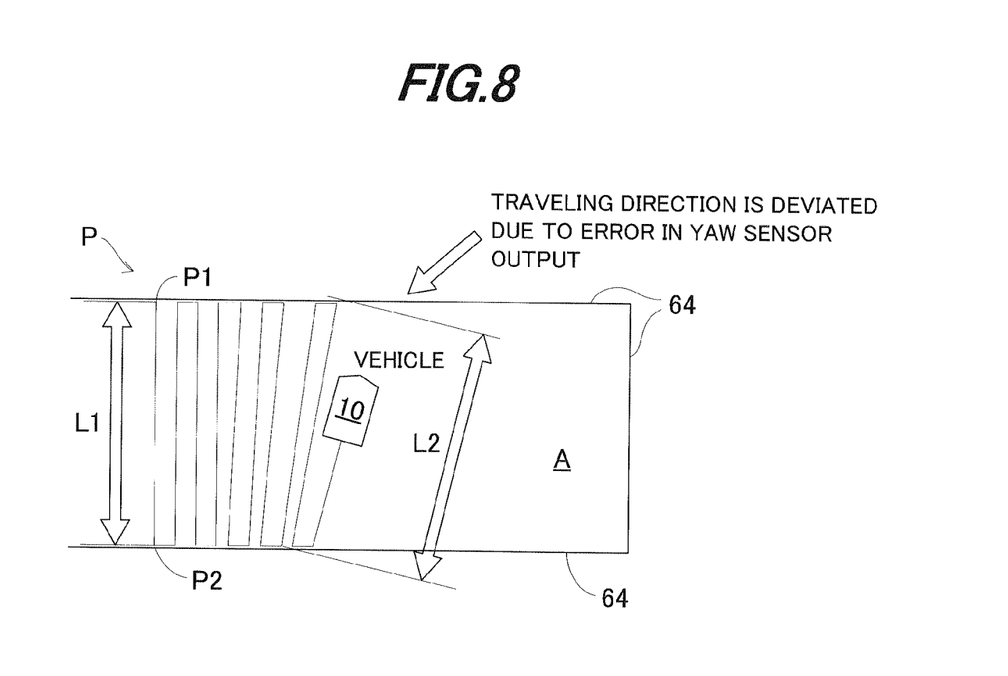
FIG. 8 is an explanatory view showing a travel pattern in the travel-scheduled area of FIG. 3.

FIG. 8 is an explanatory view showing a travel pattern P in the travel-scheduled area A. As illustrated, the travel pattern P is defined in advance so that the vehicle 10 travels straight between the opposite sides of the travel-scheduled area A, turns at the edge (border), and repeats such the travel. Note that the direction of the straight travel is determined based on the primary reference direction (i.e., the north; the upper side in FIG. 8) obtained from the orientation sensor 42 output.

Figure 9:
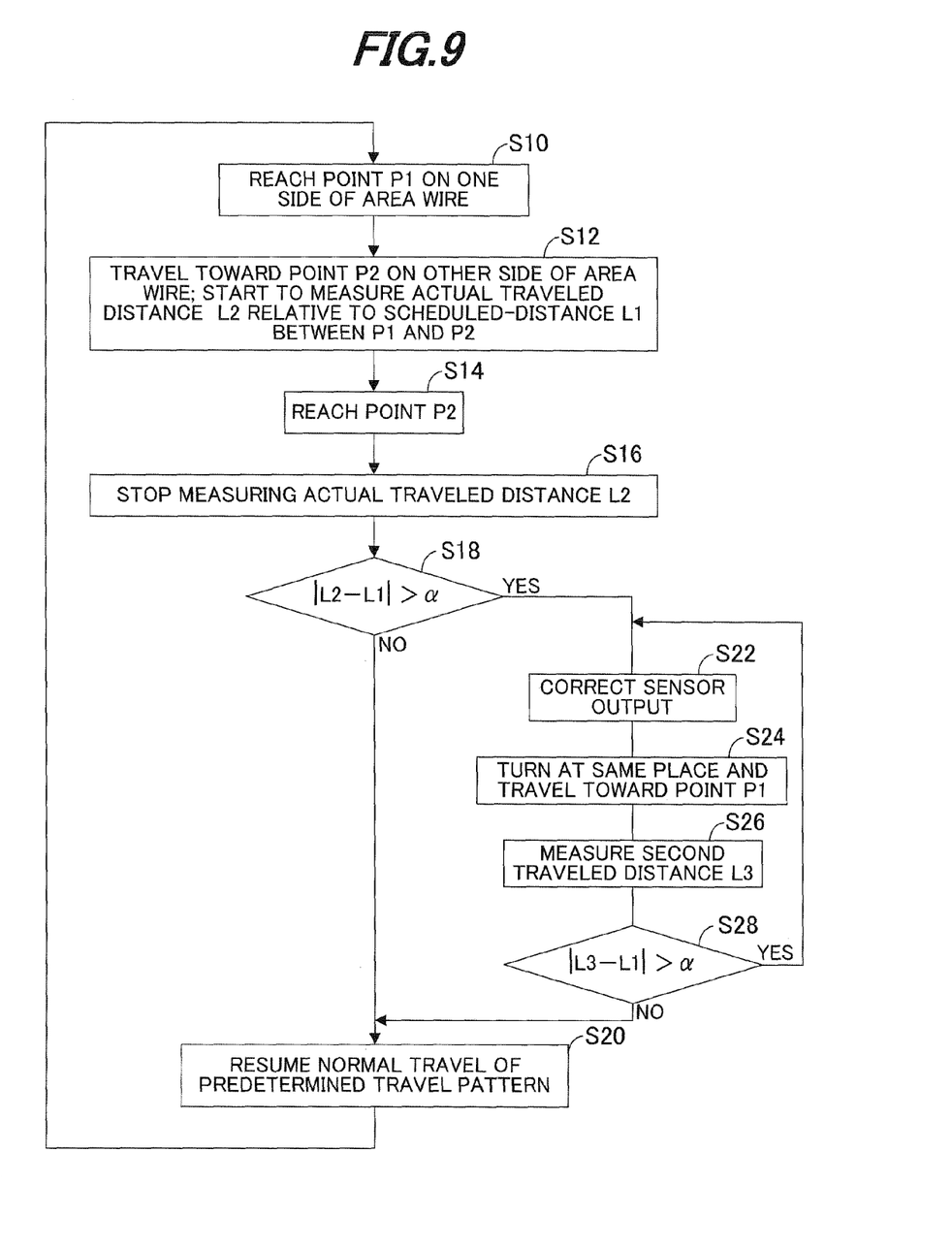
FIG. 9 is a flowchart showing the operation of the apparatus shown in FIG. 1.
Figure 10:
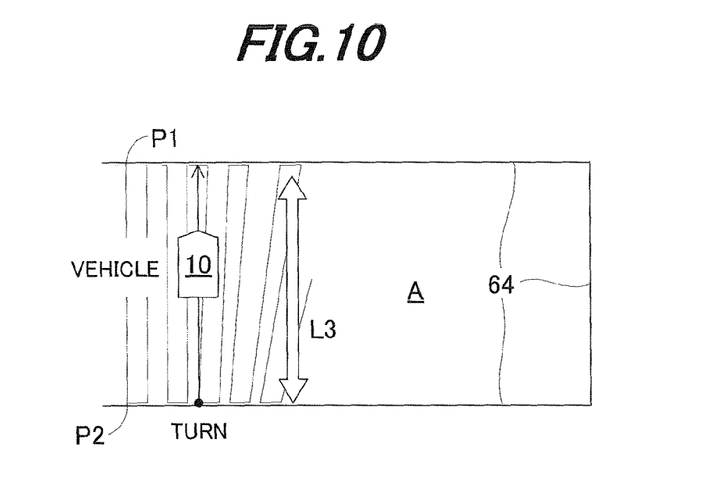
FIG. 10 is an explanatory view for explaining the operation in the FIG. 9 flowchart.
Figure 11:
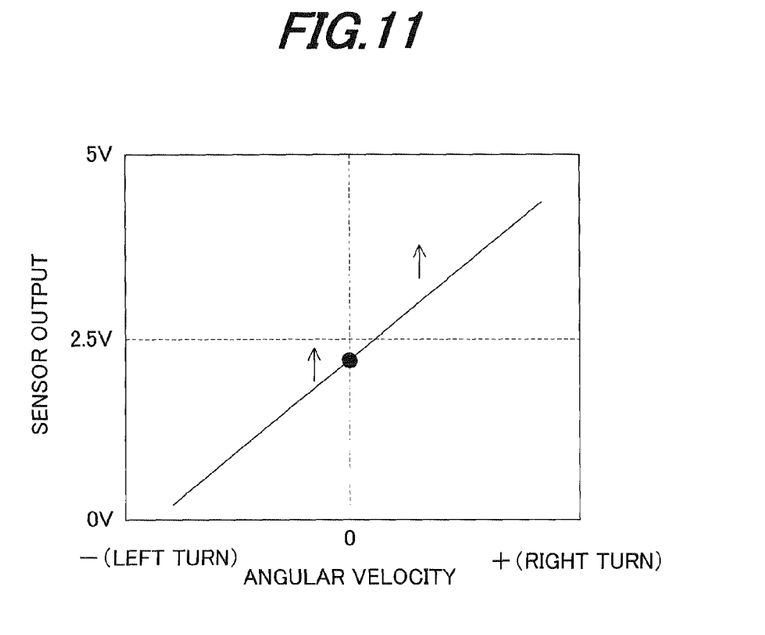
FIG. 11 is an explanatory view showing an error or a deviation of outputs of an angular velocity sensor shown in FIG. 1 caused by temperature drift.
Figure 12:
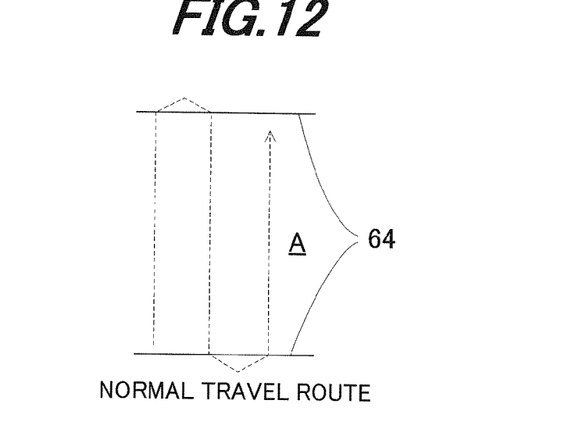
FIG. 12 is an explanatory view similar to FIG. 10, but for explaining the operation in the FIG. 9 flowchart.

FIG. 9 is a flowchart showing the operation of the ECU 40, specifically, the operation of the direction and distance calculating section 40d, etc., other than the abnormality detecting section 40g, shown in FIG. 7. FIGS. 10 to 12 are explanatory views for explaining the operation in the FIG. 9 flowchart.

The illustrated program starts when the vehicle 10 is started traveling in accordance with the predetermined travel pattern by the travel controlling section 40e and reaches a point on one side of the area wire 64, i.e., a point P1 (shown in FIG. 8) on the border of the travel-scheduled area A (S10).

Next, while the vehicle 10 is traveled toward a point P2 on the other side of the area wire 64, a distance between the points P1 and P2, i.e., the actual traveled distance L2 against the scheduled-travel distance L1 scheduled in the predetermined travel pattern is started to be measured or calculated (S12). This is calculated based on the output of the wheel speed sensor 50 as mentioned above.

When it is confirmed that the vehicle 10 has reached the point P2 in S14, the program proceeds to S16, in which the measurement (calculation) of the actual traveled distance L2 is stopped.

Next the program proceeds to S18, in which it is determined whether an absolute value of the difference between the actual traveled distance L2 and the scheduled-travel distance L1 exceeds the permissible value α. The permissible value α is set to, for instance, a half or thereabout of mowing width of the blades 20 of the vehicle 10.

When uneven parts and slopes exist in the travel-scheduled area A or when a friction coefficient of the ground surface is decreased due to rain or the like so that the vehicle 10 is slipped, it causes an error in the output of the Yaw sensor 44. As a result, as shown in FIGS. 8 and 10, the straight travel of the vehicle 10 is deviated or shifted obliquely, and consequently the traveled distance is increased.

When the result in S18 is negative, the program proceeds to S20, in which the normal travel based on the predetermined travel pattern is resumed.

On the other hand, when the result in S18 is affirmative, i.e., when the difference between the scheduled-travel distance L1 and the actual traveled distance L2 is determined to exceed the permissible value α, the program proceeds to S22, in which the sensor output is corrected, more exactly, the center value of the outputs of the Yaw sensor 44 is corrected.

Specifically, as shown in FIG. 11, although the angular velocity during the straight travel is to be 0 relative to the output of the Yaw sensor 44, since the sensor outputs may be deviated or shifted due to temperature drift, the center value is corrected, i.e., is set again as indicated by the arrows.

It should be noted that a gyroscope or an instrument using a GPS signal may be mounted on the vehicle 10 and based on its output, the output of the Yaw sensor 44 may be corrected.

Figure 13:
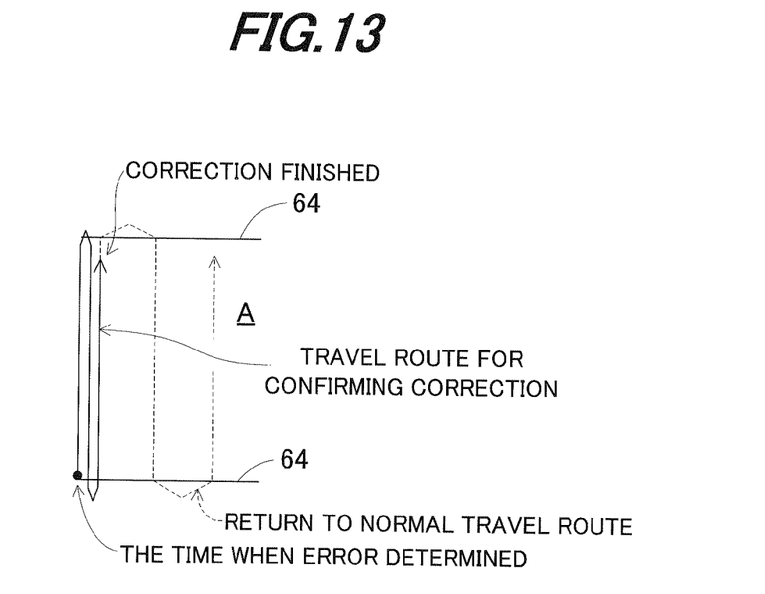
FIG. 13 is an explanatory view similar to FIG. 10, but for explaining the operation in the FIG. 9 flowchart.

Next the program proceeds to S24, in which the vehicle 10 is turned at the same place (which is so-called pivot turn) and started traveling toward the point P1. As shown in FIGS. 12 and 13, unlike the travel route during the normal travel (travel in accordance with the predetermined travel pattern), in S24, the vehicle 10 is traveled along the route already traveled in S12 and S14.

Then the program proceeds to S26, in which a second actual traveled distance L3 is measured or calculated in the same manner and to S28, in which it is determined whether an absolute value of a difference between the second actual traveled distance L3 and the scheduled-travel distance L1 exceeds the permissible value α.

When the result in S28 is negative, the program proceeds to S20, while when the result is affirmative, the program returns to S22 to repeat the foregoing processing. In other words, as long as it is determined that the difference exceeds the permissible value α, the processing of correction in S22 and the processing of straight travel (made along the already traveled route) in S24 to S26 are repeated.

It should be noted that the straight travel may be controlled by the operator through the manipulation equipment, precisely, through the personal computer 80 and radio 82 or the remote controller 84.

As stated above, the embodiment is configured to have an apparatus and method for controlling an autonomous operating vehicle (10) having a prime mover (electric motor 12), a driven wheel (14) connected to the prime mover, an operating machine (blades 20), and a magnetic sensor (operating are sensor 66) adapted to produce an output indicative of magnetic field generated at an electric wire (64) laid along a border of an operating (travel-scheduled) area (A), the vehicle being driven by the prime mover to autonomously travel in the travel-scheduled area defined by the border detected based on the output of the magnetic sensor, while performing operation using the operating machine, comprising: an angular velocity sensor (Yaw sensor 44) adapted to produce an output indicative of angular velocity generated about a vertical axis in center of gravity of the vehicle; a wheel speed sensor (50) adapted to produce an output indicative of a speed of the driven wheel of the vehicle; a direction and distance calculator (ECU 40, direction and distance calculating section 40d) adapted to calculate a traveling direction based on the output of the angular velocity sensor and a traveled distance based on the output of the wheel speed sensor; a travel and operation controller (ECU 40, travel and operation controlling section 40e, S20) adapted to control the vehicle to, as traveling straight, perform the operation using the operating machine in accordance with a predetermined travel pattern (P) in the travel-scheduled area based on the calculated traveling direction and the calculated traveled distance; and a sensor output corrector (ECU 40, sensor output correcting section 40f, S22) adapted to determine whether a difference between a scheduled-travel distance (L1) scheduled in the predetermined travel pattern and an actual traveled distance (L2) exceeds a permissible value ($\alpha$) when the vehicle is traveled straight and correct a center value of the outputs of the angular velocity sensor when the difference is determined to exceed the permissible value.

With this, even when an error occurs in the traveling direction calculated based on the output of the Yaw sensor 44, the traveling direction can be appropriately corrected to perform the operation as desired. Also it becomes possible to shorten the operating time and achieve the fine trace of the (lawnmowing) operation, thereby enhancing the operation performance.

In the apparatus, the sensor output corrector controls the vehicle to travel straight again to determine whether a difference between the predetermined scheduled-travel distance (L1) and second actual traveled distance (L3) exceeds the permissible value and repeats the correcting and the vehicle's straight traveling as long as the difference is determined to exceed the permissible value (S24 to S28). With this, it becomes possible to further shorten the operating time and achieve the fine trace of the (lawnmowing) operation, thereby further enhancing the operation performance.

In the apparatus, the sensor output corrector controls the vehicle to turn at same place and travel along an already traveled route when the vehicle is traveled straight again (S24). In other words, since it is determined whether the difference exceeds the permissible value $\alpha$ under the same traveling condition, it becomes possible to further shorten the operating time and achieve the fine trace of the (lawnmowing) operation, thereby further enhancing the operation performance.

The apparatus, further includes: a geomagnetic sensor (42) adapted to produce an output indicative of geomagnetism acting in the travel-scheduled area, and the travel and operation controller determines a direction obtained from the output of the geomagnetic sensor as a reference and controls the vehicle to, as traveling straight, perform the operation using the operating machine in accordance with the predetermined travel pattern in the travel-scheduled area. With this, since the direction obtained from the output of the orientation sensor 42 is applied as the reference, the vehicle 10 can be traveled straight accurately and therefore, it becomes possible to further shorten the operating time and achieve the fine trace of the (lawnmowing) operation, thereby still further enhancing the operation performance.

It should be noted that, in the foregoing, although the motor 12 is applied as the prime mover, it may be an internal combustion engine or another prime mover instead. Also, the blades 20 for mowing lawn are exemplified as the operating machine, but it should not be limited thereto.

Japanese Patent Application No. 2010-222642, filed on Sep. 30, 2010 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an autonomous operating vehicle having a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while performing operation using the operating machine, comprising:

an angular velocity sensor adapted to produce an output indicative of angular velocity generated about a vertical axis in center of gravity of the vehicle;

a wheel speed sensor adapted to produce an output indicative of a speed of the driven wheel of the vehicle;

a direction and distance calculator adapted to calculate a traveling direction based on the output of the angular velocity sensor and a traveled distance based on the output of the wheel speed sensor;

a travel and operation controller adapted to control the vehicle to, as traveling straight, perform the operation using the operating machine in accordance with a predetermined travel pattern in the travel-scheduled area based on the calculated traveling direction and the calculated traveled distance; and a sensor output corrector adapted to determine whether a difference between a scheduled-travel distance scheduled in the predetermined travel pattern and an actual traveled distance exceeds a permissible value when the vehicle is traveled straight and correct a center value of the outputs of the angular velocity sensor when the difference is determined to exceed the permissible value.

2. The apparatus according to claim 1, wherein the sensor output corrector controls the vehicle to travel straight again to determine whether a difference between the scheduled travel distance and second actual traveled distance exceeds the permissible value and repeats the correcting and the vehicle's straight traveling as long as the difference is determined to exceed the permissible value.

3. The apparatus according to claim 2, wherein the sensor output corrector controls the vehicle to turn at same place and travel along an already traveled route when the vehicle is traveled straight again.

4. The apparatus according to claim 1, further including:

a geomagnetic sensor adapted to produce an output indicative of geomagnetism acting in the travel-scheduled area, and the travel and operation controller determines a direction obtained from the output of the geomagnetic sensor as a reference and controls the vehicle to, as traveling straight, perform the operation using the operating machine in accordance with the predetermined travel pattern in the travel-scheduled area.

5. An apparatus for controlling an autonomous operating vehicle having a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while performing operation using the operating machine, comprising:

angular velocity sensor means for producing an output indicative of angular velocity generated about a vertical axis in center of gravity of the vehicle;

wheel speed sensor means for producing an output indicative of a speed of the driven wheel of the vehicle;

direction and distance calculating means for calculating a traveling direction based on the output of the angular velocity sensor means and a traveled distance based on the output of the wheel speed sensor means;

travel and operation controlling means for controlling the vehicle to, as traveling straight, perform the operation using the operating machine in accordance with a predetermined travel pattern in the travel-scheduled area based on the calculated traveling direction and the calculated traveled distance; and sensor output corrector adapted to determine whether a difference between a scheduled-travel distance scheduled in the predetermined travel pattern and an actual traveled distance exceeds a permissible value when the vehicle is traveled straight and correct a center value of the outputs of the angular velocity sensor means when the difference is determined to exceed the permissible value.

6. The apparatus according to claim 5, wherein the sensor output correcting means controls the vehicle to travel straight again to determine whether a difference between the scheduled-travel distance and second actual traveled distance exceeds the permissible value and repeats the correcting and the vehicle's straight traveling as long as the difference is determined to exceed the permissible value.

7. The apparatus according to claim 6, wherein the sensor output correcting means controls the vehicle to turn at same place and travel along an already traveled route when the vehicle is traveled straight again.

8. The apparatus according to claim 5, further including:

a geomagnetic sensor means for producing an output indicative of geomagnetism acting in the travel-scheduled area, and the travel and operation controlling means determines a direction obtained from the output of the geomagnetic sensor means as a reference and controls the vehicle to, as traveling straight, perform the operation using the operating machine in accordance with the predetermined travel pattern in the travel-scheduled area.

9. A method for controlling an autonomous operating vehicle having a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while performing operation using the operating machine, comprising the steps of:

obtaining a sensor output indicative of angular velocity generated about a vertical axis in center of gravity of the vehicle;

obtaining a sensor output indicative of a speed of the driven wheel of the vehicle;

calculating a traveling direction based on the sensor output indicative of the angular velocity and a traveled distance based on the sensor output indicative of the wheel speed;

controlling the vehicle to, as traveling straight, perform the operation using the operating machine in accordance with a predetermined travel pattern in the travel-scheduled area based on the calculated traveling direction and the calculated traveled distance; and determining whether a difference between a scheduled-travel distance scheduled in the predetermined travel pattern and an actual traveled distance exceeds a permissible value when the vehicle is traveled straight and correcting a center value of the sensor outputs indicative of the angular velocity when the difference is determined to exceed the permissible value.

10. The method according to claim 9, wherein the step of sensor output correcting controls the vehicle to travel straight again to determine whether a difference between the scheduled-travel distance and second actual traveled distance exceeds the permissible value and repeats the correcting and the vehicle's straight traveling as long as the difference is determined to exceed the permissible value.

11. The method according to claim 10, wherein the step of sensor output correcting controls the vehicle to turn at same place and travel along an already traveled route when the vehicle is traveled straight again.

12. The method according to claim 9, further including the step of:

obtaining a sensor output indicative of geomagnetism acting in the travel-scheduled area, and the step of travel and operation controlling determines a direction obtained from the sensor output indicative of the geomagnetism as a reference and controls the vehicle to, as traveling straight, perform the operation using the operating machine in accordance with the predetermined travel pattern in the travel-scheduled area.

* * * * *